United States Patent
Yokota et al.

(10) Patent No.: US 9,415,741 B2
(45) Date of Patent: Aug. 16, 2016

(54) VEHICLE INTERIOR PANEL AND VEHICLE AIRBAG DEVICE

(71) Applicant: TOYODA GOSEI CO., LTD., Kiyosu-shi, Aichi-ken (JP)

(72) Inventors: Nobuhiko Yokota, Kiyosu (JP); Chiharu Totani, Kiyosu (JP); Minoru Toda, Kiyosu (JP); Kenji Shibayama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/437,915

(22) PCT Filed: Nov. 5, 2013

(86) PCT No.: PCT/JP2013/079857
§ 371 (c)(1),
(2) Date: Apr. 23, 2015

(87) PCT Pub. No.: WO2014/069654
PCT Pub. Date: May 8, 2014

(65) Prior Publication Data
US 2015/0274112 A1 Oct. 1, 2015

(30) Foreign Application Priority Data

Nov. 5, 2012 (JP) .................................. 2012-243737

(51) Int. Cl.
*B60R 21/16* (2006.01)
*B60R 21/2165* (2011.01)
(Continued)

(52) U.S. Cl.
CPC .............. *B60R 21/2165* (2013.01); *B32B 5/02* (2013.01); *B32B 7/12* (2013.01); *B60K 37/00* (2013.01);
(Continued)

(58) Field of Classification Search
CPC .. B60R 2021/161; B60R 21/20; B60R 21/205
USPC .............................................. 280/728.3, 732
See application file for complete search history.

(56) References Cited

U.S. PATENT DOCUMENTS

| 5,437,469 A | 8/1995 | Monden |
| 5,865,461 A | 2/1999 | Totani et al. |

(Continued)

FOREIGN PATENT DOCUMENTS

| JP | H05-147488 A | 6/1993 |
| JP | H11-170953 A | 6/1999 |

(Continued)

OTHER PUBLICATIONS

International Preliminary Report on Patentability issued on May 5, 2015 in the corresponding PCT/JP 2013/079857.

(Continued)

*Primary Examiner* — Toan To
(74) *Attorney, Agent, or Firm* — Posz Law Group, PLC

(57) ABSTRACT

A vehicle interior panel includes a base member including a door portion and a cover member adhered to a surface of the base member by an adhesive layer. The door portion includes an end that is opened by an inflation pressure of an airbag. The end of the door portion forms a base member end together with an end of a base member body of the base member. The adhesive layer has an adhesive force set so that the cover member that covers a portion of the base member body that is adjacent to the door portion is separated from the adjacent portion as the door portion opens when pushed by the inflation pressure of the airbag.

10 Claims, 11 Drawing Sheets

(51) Int. Cl.
  *B60K 37/00*   (2006.01)
  *B60R 21/205*  (2011.01)
  *B60R 21/216*  (2011.01)
  *B32B 5/02*    (2006.01)
  *B32B 7/12*    (2006.01)
  *B60R 21/215*  (2011.01)

(52) U.S. Cl.
  CPC ............. *B60R 21/205* (2013.01); *B60R 21/216* (2013.01); *B32B 2605/003* (2013.01); *B32B 2605/08* (2013.01); *B60R 2021/21512* (2013.01); *Y10T 428/15* (2015.01); *Y10T 428/31931* (2015.04)

(56) References Cited

U.S. PATENT DOCUMENTS

| | | | | |
|---|---|---|---|---|
| 5,997,030 | A * | 12/1999 | Hannert | B60R 21/2165 280/728.3 |
| 6,050,595 | A * | 4/2000 | Knox | B60R 21/2165 280/728.3 |
| 6,109,645 | A | 8/2000 | Totani et al. | |
| 6,203,056 | B1 * | 3/2001 | Labrie | B29C 45/14 280/728.3 |
| 6,322,101 | B1 | 11/2001 | Suizu et al. | |
| 6,457,738 | B1 * | 10/2002 | Labrie | B60R 21/216 280/728.3 |
| 6,860,505 | B2 * | 3/2005 | Yasuda | B60R 21/216 280/728.2 |
| 7,007,970 | B2 * | 3/2006 | Yasuda | B29C 65/06 280/728.3 |
| 7,040,649 | B2 * | 5/2006 | Totani | B29C 37/0057 280/728.3 |
| 8,662,526 | B2 * | 3/2014 | Fujiwara | B60R 21/215 280/728.3 |
| 2005/0104346 | A1 * | 5/2005 | Suwama | B29C 45/1671 280/732 |
| 2009/0230660 | A1 | 9/2009 | Ohgo et al. | |
| 2010/0102540 | A1 | 4/2010 | Kobayashi et al. | |

FOREIGN PATENT DOCUMENTS

| | | |
|---|---|---|
| JP | 2000-071926 A | 3/2000 |
| JP | 2002-347552 A | 12/2002 |
| JP | 2008-230581 A | 10/2008 |
| JP | 2009-248910 A | 10/2009 |

OTHER PUBLICATIONS

International Search Report of the International Searching Authority mailed Feb. 18, 2014 for the corresponding international application No. PCT/JP2013/079857 (and English translation).

Office Action mailed Jun. 7, 2016 issued in the corresponding Japanese Patent Application No. JP 2014-544621.

* cited by examiner

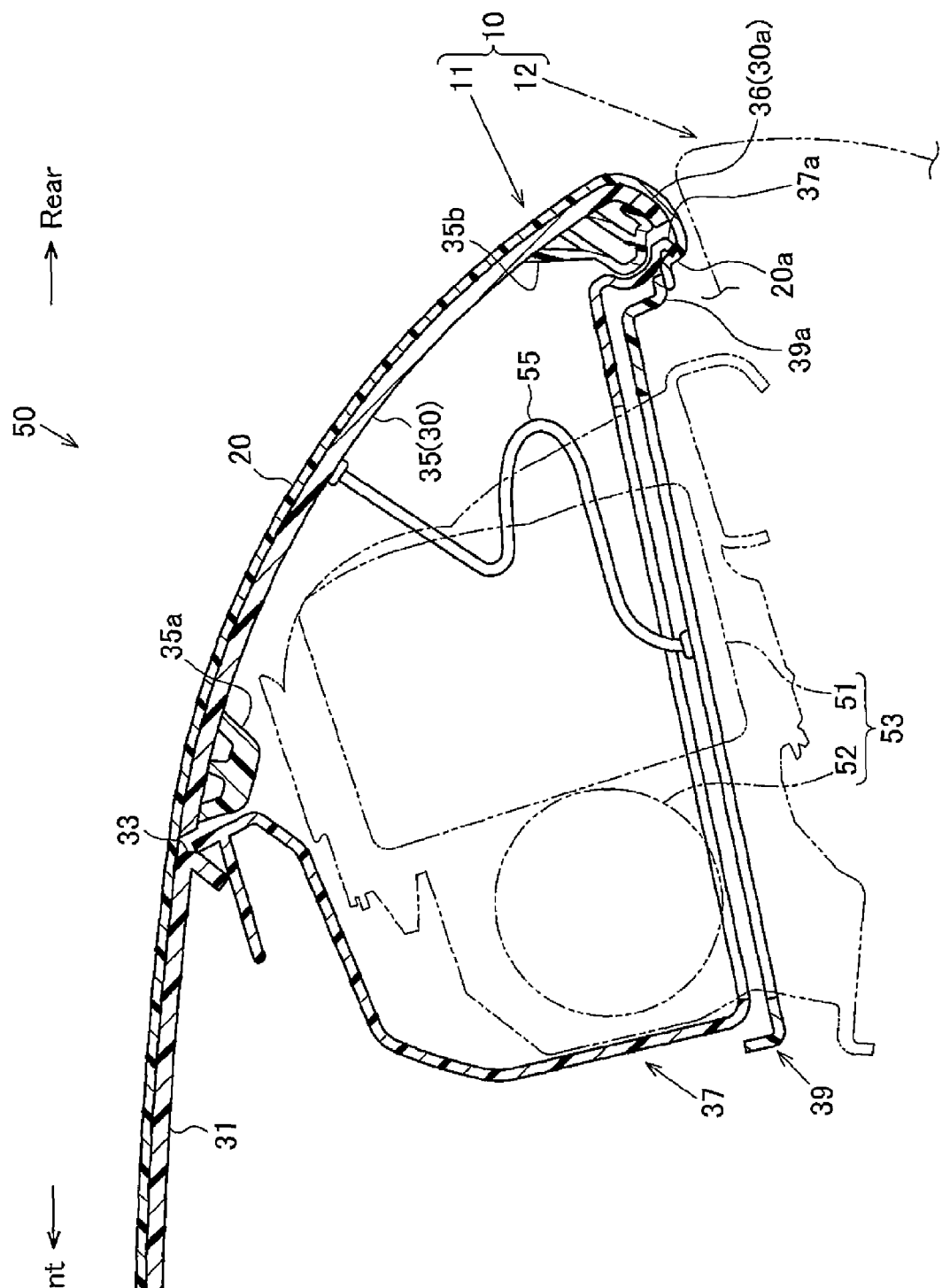

VEHICLE INTERIOR PANEL AND VEHICLE AIRBAG DEVICE

CROSS REFERENCE TO RELATED APPLICATIONS

This application is a U.S. national stage application of PCT/JP2013/079857 filed on Nov. 5, 2013, which is based on and claims priority to Japanese Patent Application No. 2012-243737 filed on Nov. 5, 2012, the contents of which are incorporated herein by reference.

BACKGROUND

The present invention relates to a vehicle interior panel and a vehicle airbag device.

Airbag devices for passenger seats are installed in automobiles (refer to, for example, Patent Document 1). Such an airbag device includes an upper panel, which forms the upper portion of an instrument panel, and an airbag module that is located inside the upper panel. The upper panel includes a base member and a cover member that is adhered to the outer surface of the base member. The inner surface of the base member includes a tear groove, from which the base member starts to tear when the inflation pressure of the airbag is applied. The airbag module includes an inflator, which generates inflation gas, and an airbag that is inflated and deployed by the gas supplied from the inflator.

The inner surface of the cover member may also include a tear groove at a location corresponding to the tear groove of the base member. When an instrument panel includes such a cover member, the cover member is broken in a suitable manner along the tear groove of the cover member as the inflation pressure of the airbag tears the base member. Since the tear groove is formed in the inner surface of the cover member, the tear groove does not adversely affect the aesthetic appeal of the cover member. Such a tear groove of the cover member is formed by, for example, laser processing.

PRIOR ART DOCUMENT

Patent Document

Patent Document 1: Japanese Laid-Open Patent Publication No. 2000-71926

Such an instrument panel and an airbag device require a process for forming the tear groove in the cover member. When the cover member is adhered to the surface of a base member, the base member and the cover member need to be aligned so that the tear groove of the base member corresponds to that of the base member. This complicates the manufacturing process of the instrument panel.

SUMMARY

It is an object of the present invention to provide a vehicle interior panel and a vehicle airbag device that can easily be manufactured as a structure that opens a door portion with the inflation pressure of an airbag in a preferred manner without adversely affecting the aesthetic appeal of the cover member.

To achieve the above object, a vehicle interior panel is provided that includes a base member including a door portion and a cover member adhered to a surface of the base member by an adhesive layer. The door portion includes an end that is opened by an inflation pressure of an airbag. The end of the door portion forms a base member end together with an end of a base member body of the base member. The adhesive layer has an adhesive force set so that the cover member that covers a portion of the base member body that is adjacent to the door portion is separated from the adjacent portion as the door portion opens when pushed by the inflation pressure of the airbag.

In the above structure, when the door portion is pushed by the inflation pressure of the airbag, the cover member, which covers the portion of the base member body that is adjacent to the door portion, expands and separates from the base member body. This opens the cover member, which covers the base member body, in the form of a fish mouth without breaking the cover member. This opens an end of the door portion and the airbag moves out of the interior panel.

Thus, in the above structure, the adhesive force of the adhesive layer is set to separate the cover member, which covers the base member body, from the base member body. This opens an end of the door portion without breaking the cover member. Thus, the interior panel can be manufactured more easily than a structure in which a tear groove is formed in the inner surface of a cover member and the cover member is adhered to a base member so that the tear groove is aligned with the boundary line between a door portion and a base member body. Since the base member does not include a tear groove, the aesthetic appeal of the cover member is maintained.

To achieve the above object, a vehicle interior panel is provided that includes a base member including a door portion and a cover member adhered to a surface of the base member. The door portion includes an end that is opened by an inflation pressure of an airbag. The end of the door portion forms a base member end together with an end of a base member body of the base member. The cover member includes an extension extending from the base member end toward an inner side of the base member. A fragile portion is arranged in a portion in the extension of the cover member between the door portion and the base member body. In this structure, when the door portion is pushed by the inflation pressure of the airbag, the cover member starts to tear from the fragile portion along the boundary line between the door portion and the base member body. This opens an end of the door portion and the airbag moves out of the interior panel.

Thus, in the above structure, the cover member is broken in a preferred manner merely by arranging the fragile portion in the extension, which extends toward an inner side of the base member end. Accordingly, the interior panel can be manufactured more easily than a structure in which a tear groove is formed in the inner surface of a cover member and the cover member is adhered to a base member so that the tear groove is aligned with the boundary line between a door portion and a base member body. Since the fragile portion is formed in the cover member and located at the inner side of the base member end, the aesthetic appeal of the cover member is unlikely to be adversely affected.

The present invention succeeds in facilitating manufacture of an interior panel in which the inflation pressure of an airbag opens a door portion in a preferred manner without adversely affecting the aesthetic appeal of the cover member.

BRIEF DESCRIPTION OF THE DRAWINGS

FIG. 3 is a cross-sectional view taken along line 3-3 in FIG. 1.

DETAILED DESCRIPTION OF THE PREFERRED EMBODIMENTS

First Embodiment

A vehicle interior panel and a vehicle airbag device according to a first embodiment of the present invention, which are an upper panel that form an instrument panel of an automobile and an airbag device for a passenger seat, respectively, will now be described with reference to FIGS. 1 to 7.

Figure 1:
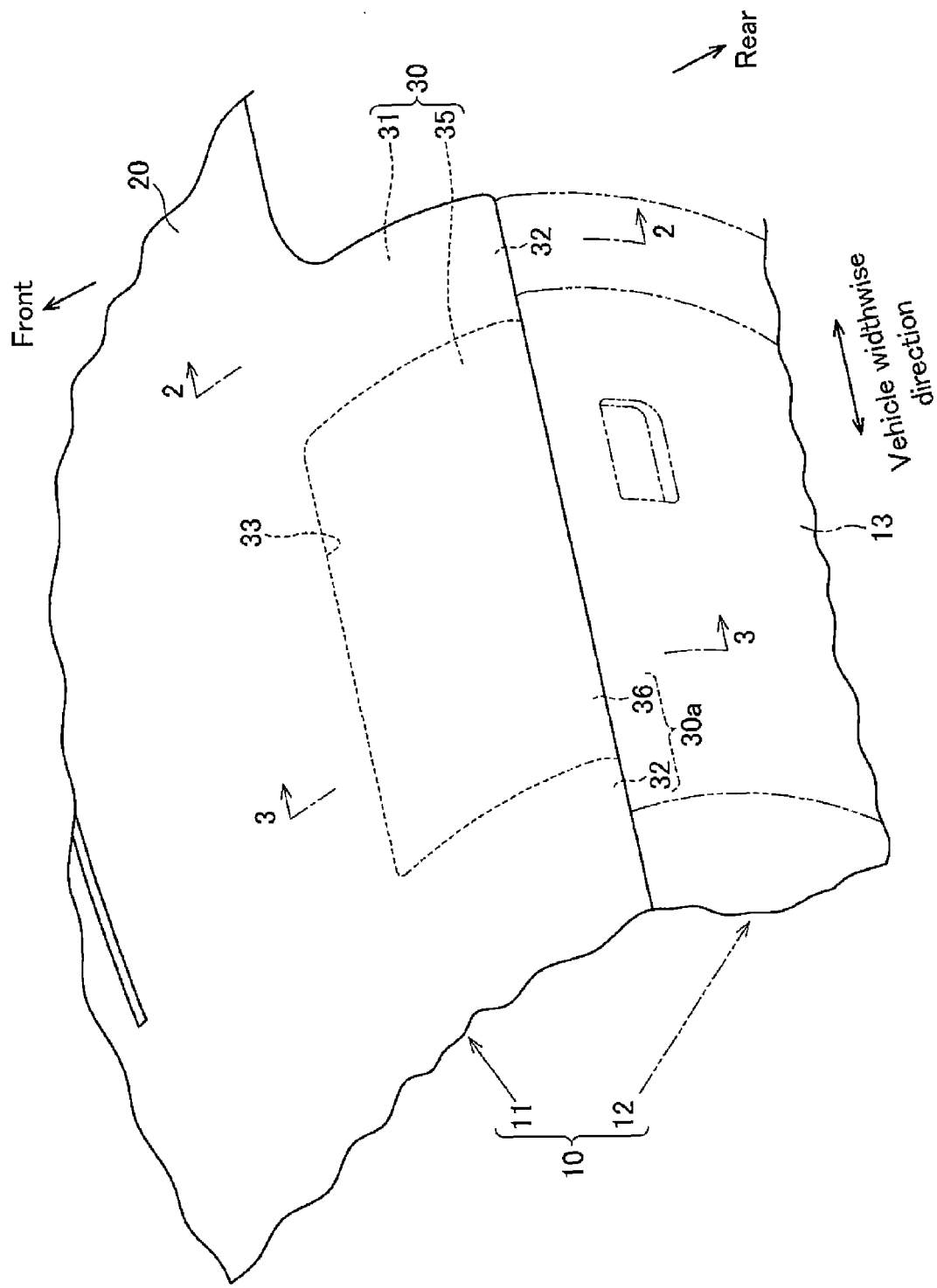
FIG. 1 is a perspective view showing a perspective structure of an instrument panel according to a first embodiment of the present invention.

As shown in FIG. 1, an instrument panel 10 of an automobile includes an upper panel 11, which is located in front of a passenger seat, and a lower panel 12, which is located below the upper panel 11 and includes a glove compartment 13.

Referring to FIGS. 2 to 4(a), the upper panel 11 includes a base member 30, which serves as a core material, and a cover member 20, which is adhered to the surface of the base member 30 by an adhesive layer 40. The adhesive layer 40 is formed of an adhesive, such as chloroprene rubber (CR).

Figure 4A:
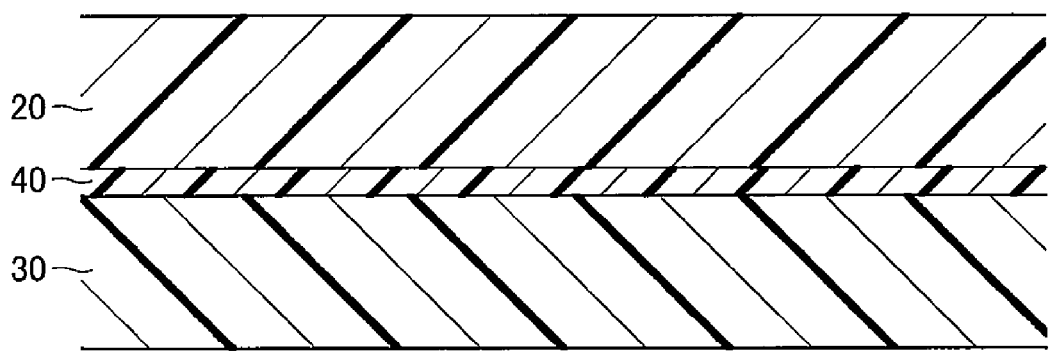
FIG. 4(a) is a cross-sectional view showing an upper panel in the embodiment.
Figure 4B:
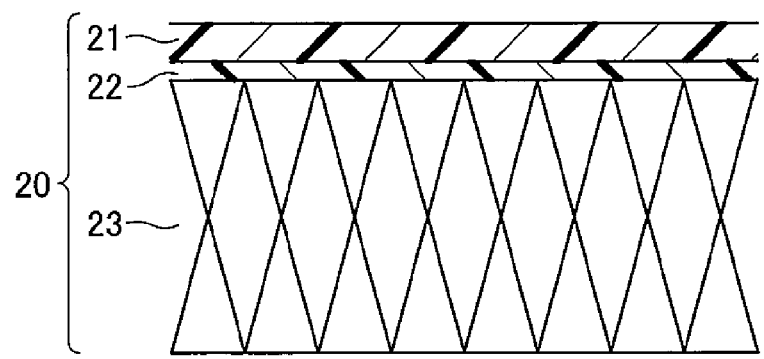
FIG. 4(b) is a cross-sectional view showing a cover member in the embodiment.

As shown in FIG. 4(b), the cover member 20 has a triple-layer structure including a base fabric layer 22, a cover layer 21, which is adhered to the outer surface of the base fabric layer 22, and a cushion layer 23, which is adhered to the inner surface of the base fabric layer 22. The base fabric layer 22 is formed by, for example, a knitting of fibers of a synthetic resin such as polyester. The cover layer 21 is formed of, for example, polyurethane. The cushion layer 23 is formed by, for example, a double-raschel knitting of fibers of a synthetic resin such as polyester. More specifically, the cover member 20 is formed by adhering the cover layer 21, which is adhered in advance to the surface of the base fabric layer 22, to the surface of the cushion layer 23.

Figure 2:
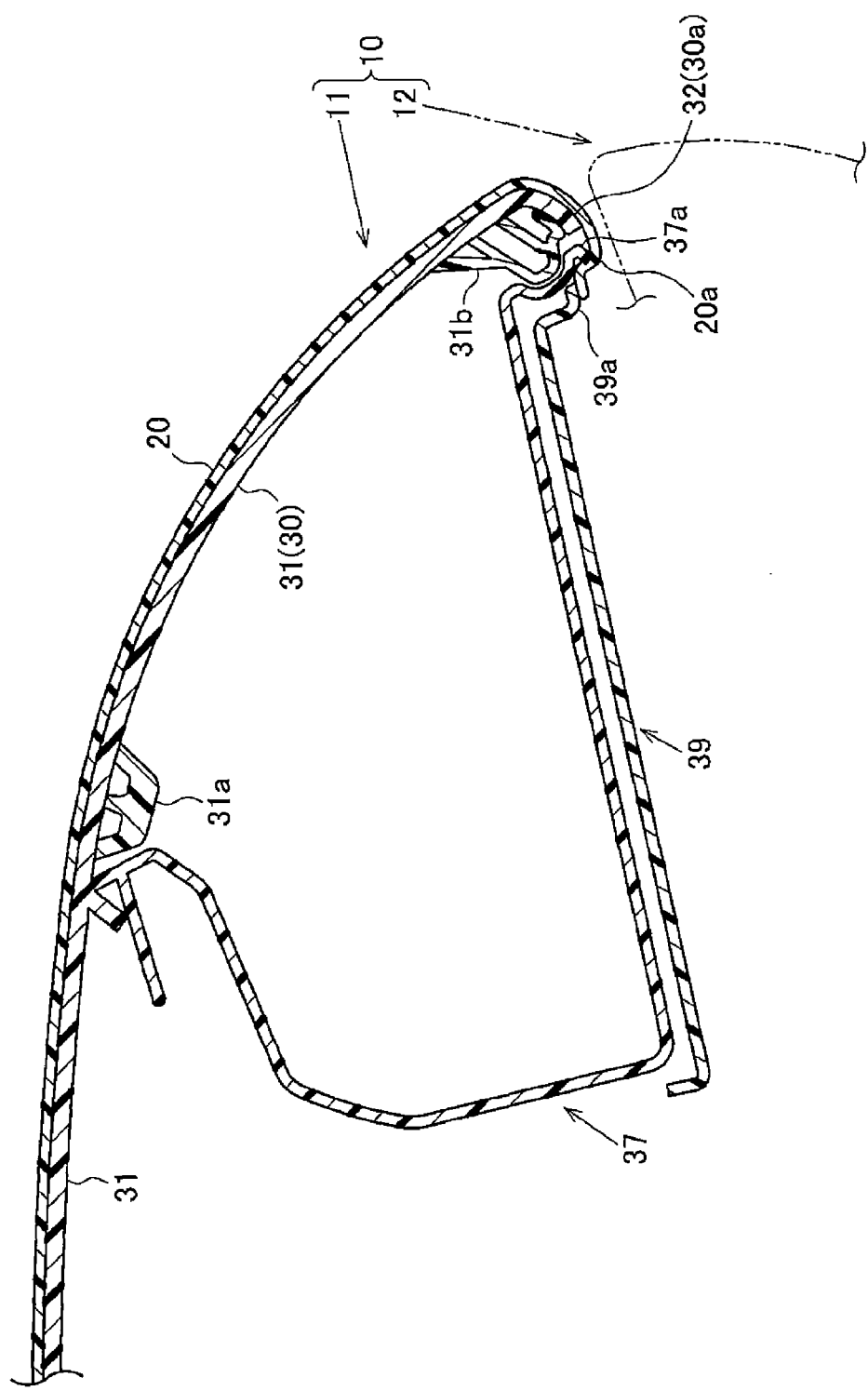
FIG. 2 is a cross-sectional view taken along line 2-2 in FIG. 1.

As shown in FIGS. 1 to 3, the base member 30 includes a base member body 31 and a tetragonal door portion 35, which is accommodated in a tetragonal opening 33 formed on the base member body 31. The opening 33 extends to a rear end 32 of the base member body 31. Thus, a rear end 36 of the door portion 35 forms a base member rear end 30a together with the rear end 32 of the base member body 31. The base member body 31 and the door portion 35 are each formed of a hard resin material, such as thermoplastic olefin (TPO), and molded through injection molding.

As shown in FIG. 3, reinforcement ribs 35a and 35b are fixed to the inner surface of the door portion 35 at the front end and the rear end. As shown in FIG. 2, reinforcement ribs 31a and 31b are respectively fixed to a portion of the inner surface of the base member body 31 that corresponds to the rib 35a and the inner surface of the rear end 32.

As shown in FIGS. 2 and 3, the inner side of the base member 30 includes a plate 39, which serves as a support structure for the base member body 31. The plate 39 and the base member body 31 are coupled to each other by a coupling portion (not shown).

As shown in FIG. 3, the automobile includes a passenger seat airbag device 50. When impact is applied to the automobile from the front, the airbag device 50 inflates and deploys an airbag 51 in front of the passenger seat to protect an occupant from the impact.

A retainer 37 is arranged above the plate 39. The retainer 37 retains the folded airbag 51 and an inflator 52, which generates inflation gas and supplies the gas to the airbag 51. The inflator 52 and the airbag 51 form an airbag module 53.

Two support belts 55 each include an end fixed to the plate 39 and another end fixed to the inner surface of the door portion 35. The support belts 55 are respectively arranged on the two ends of the door portion 35 in the vehicle widthwise direction.

As shown in FIGS. 2 and 3, the retainer 37 extends in the front-to-rear direction. The retainer 37 includes a rear end 37a, which is located close to the front parts of the rear ribs 31b and 35b of the base member body 31 and the door portion 35. The plate 39 extends in the front-to-rear direction. The plate 39 includes a rear end 39a, which is located close to the front part of the rear end 37a of the retainer 37.

The cover member 20 has an extension 20a, which extends from the base member rear end 30a toward the inner side of the base member 30. The extension 20a extends to the rear end 39a of the plate 39.

Figure 5:
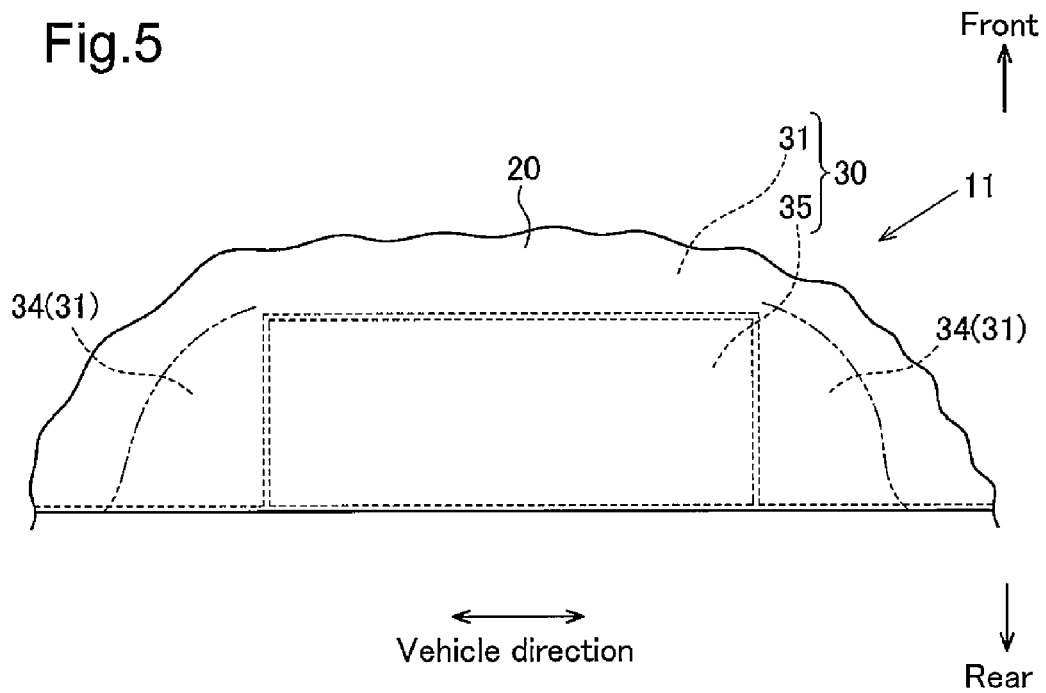
FIG. 5 is a front view mainly showing a rear end of the upper panel in the embodiment.
Figure 6:
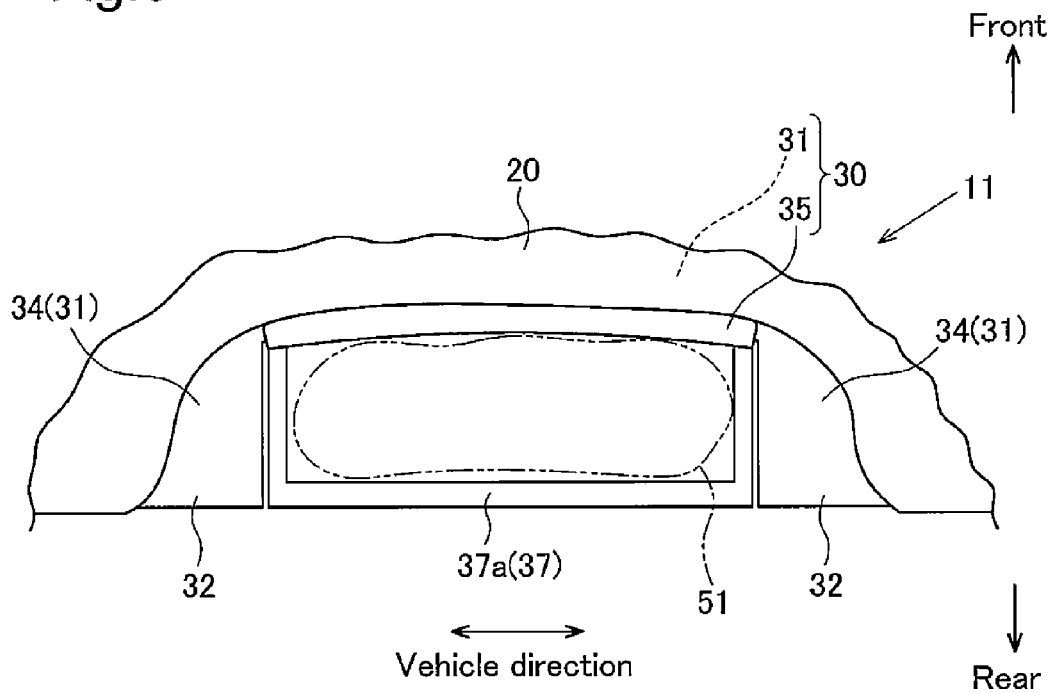
FIG. 6 is a front view, corresponding to FIG. 5, showing a door portion when opened.

In the present embodiment, the adhesive force of the adhesive layer 40 is set so that the cover member 20 that covers an adjacent portion 34 of the base member body 31, which is adjacent to the door portion 35, is separated from the base member body 31 when the inflation pressure of the airbag 51 pushes and opens the door portion 35, as shown in FIGS. 5 and 6.

Next, the operation of the present embodiment will be described.

When impact is applied to the automobile from the front, inflation gas is supplied from the inflator 52 to the airbag 51. This inflates the airbag 51 toward the door portion 35 while unfolding the airbag 51. The inflation pressure of the airbag 51 pushes the door portion 35 toward the outside.

Figure 7:
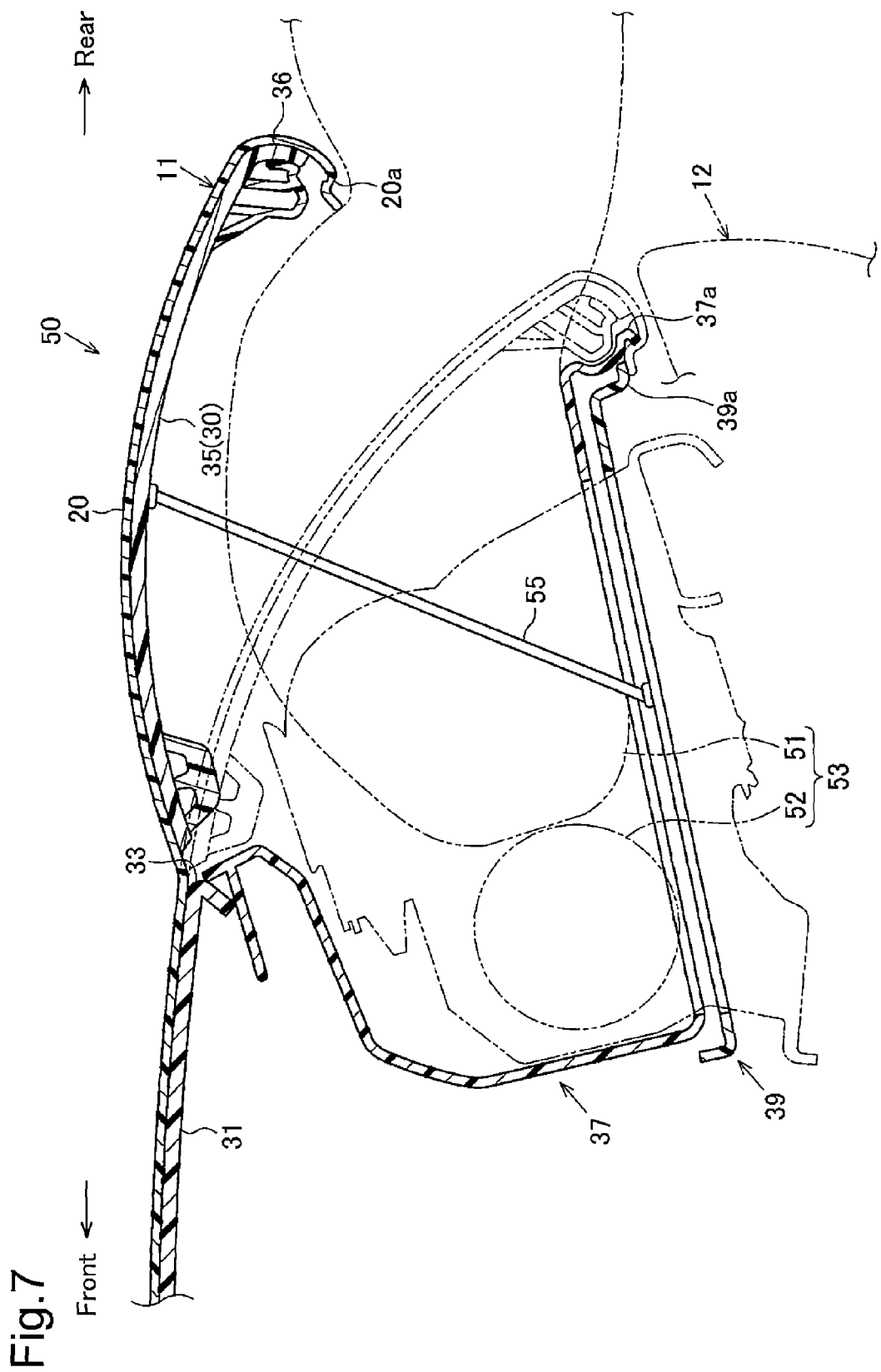
FIG. 7 is a cross-sectional view, corresponding to FIG. 3, showing the door portion when opened.

Referring to FIG. 6, from the condition shown in FIG. 5, a portion of the cover member 20 that covers the adjacent portion 34 of the base member body 31, which is adjacent to the door portion 35, expands and separates from the adjacent portion 34. This opens the cover member 20, which covers the base member body 31, in the form of a fish mouth without breaking the cover member 20. Referring to FIG. 7, the rear end 36 of the door portion 35 opens, and the airbag 51 moves out of the upper panel 11.

The support belts 55 restrict the maximum open degree of the door portion 35. This limits excessive opening of the door portion 35. Thus, the outward movement direction of the airbag 51 may be controlled in a preferred manner.

The above vehicle interior panel and vehicle airbag device according to the present embodiment have the advantages described below.

(1) The rear end 36 of the door portion 35 forms the base member rear end 30a together with the rear end 32 of the base member body 31. The adhesive force of the adhesive layer 40 is set so that the cover member 20 that covers the adjacent portion 34 of the base member body 31, which is adjacent to the door portion 35, is separated from the base member body 31 when the inflation pressure of the airbag 51 pushes and opens the door portion 35.

In such a structure, the adhesive force of the adhesive layer 40 is set to separate the cover member 20, which covers the base member body 31, from the base member body 31. This opens the rear end 36 of the door portion 35 without breaking the cover member 20. Thus, the upper panel 11 can be manufactured more easily than a structure in which a tear groove is formed in the inner surface of a cover member and the cover member is adhered to a base member so that the tear groove is aligned with the boundary line between a door portion and a base member body. Since the base member 30 does not include a tear groove, the aesthetic appeal of the cover member 20 is maintained. This facilitates manufacturing of the upper panel 11, in which the inflation pressure of the airbag 51 opens the door portion 35 in a preferred manner, without adversely affecting the aesthetic appeal of the cover member 20.

(2) The plate 39, which is located inside the base member 30, and the door portion 35 are coupled to each other by the two support belts 55, which restrict the maximum open degree of the door portion 35. The support belts 55 are respectively arranged on the two ends of the door portion 35 in the vehicle widthwise direction.

In such a structure, since the maximum open degree of the door portion 35 is restricted in a preferred manner, the door portion 35 does not open excessively. This allows the outward movement direction of the airbag 51 to be controlled. Accordingly, even when the airbag is small in size, passengers are properly protected from impacts. In addition, the restriction of the maximum open degree of the door portion 35 prevents excessive separation of the cover member 20 from the base member body 31.

Second Embodiment

A second embodiment of the present invention will now be described with reference to FIGS. 8 to 13.

Figure 8:
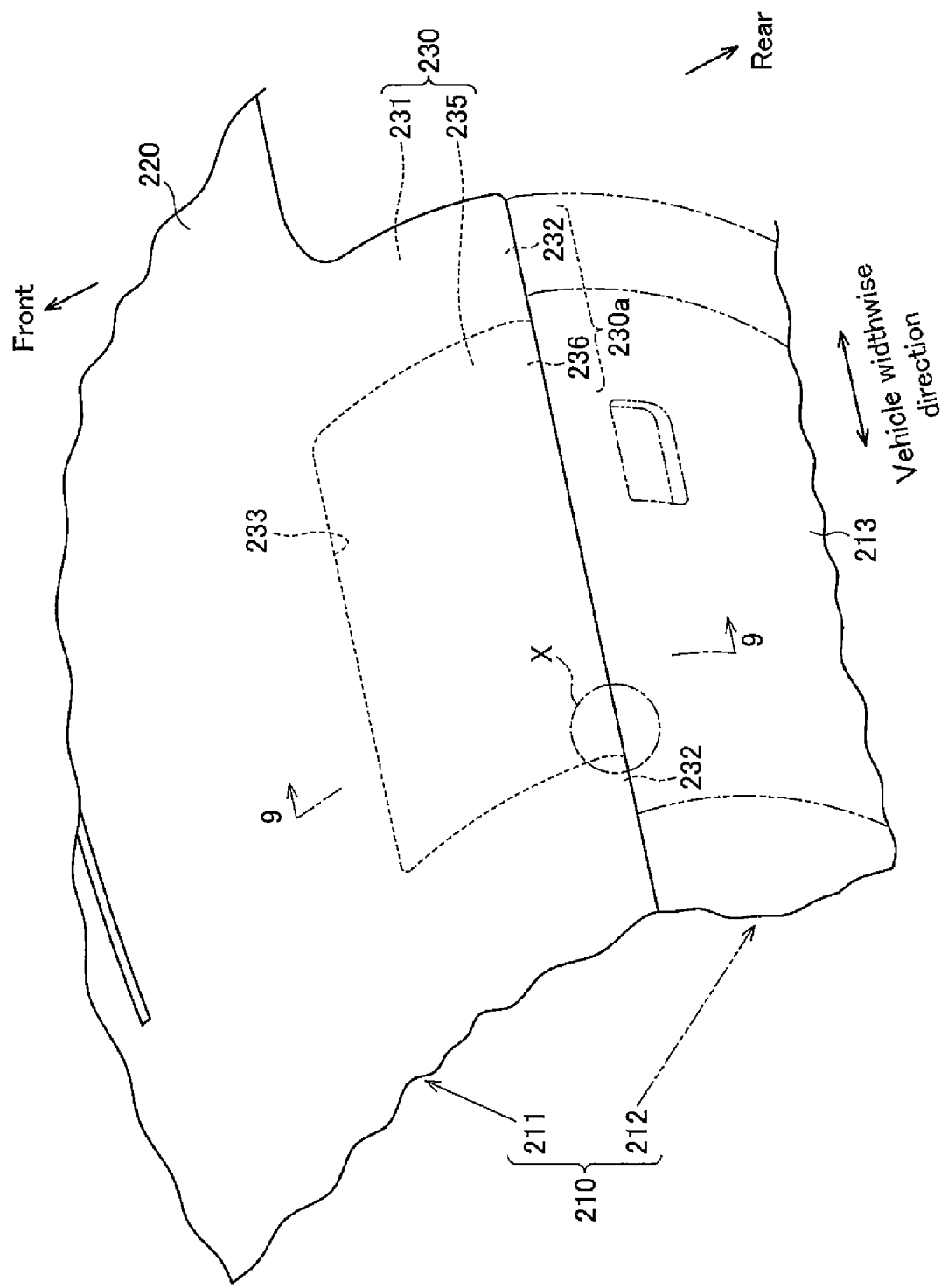
FIG. 8 is a perspective view showing a perspective structure of an instrument panel according to a second embodiment of the present invention.
Figure 9:
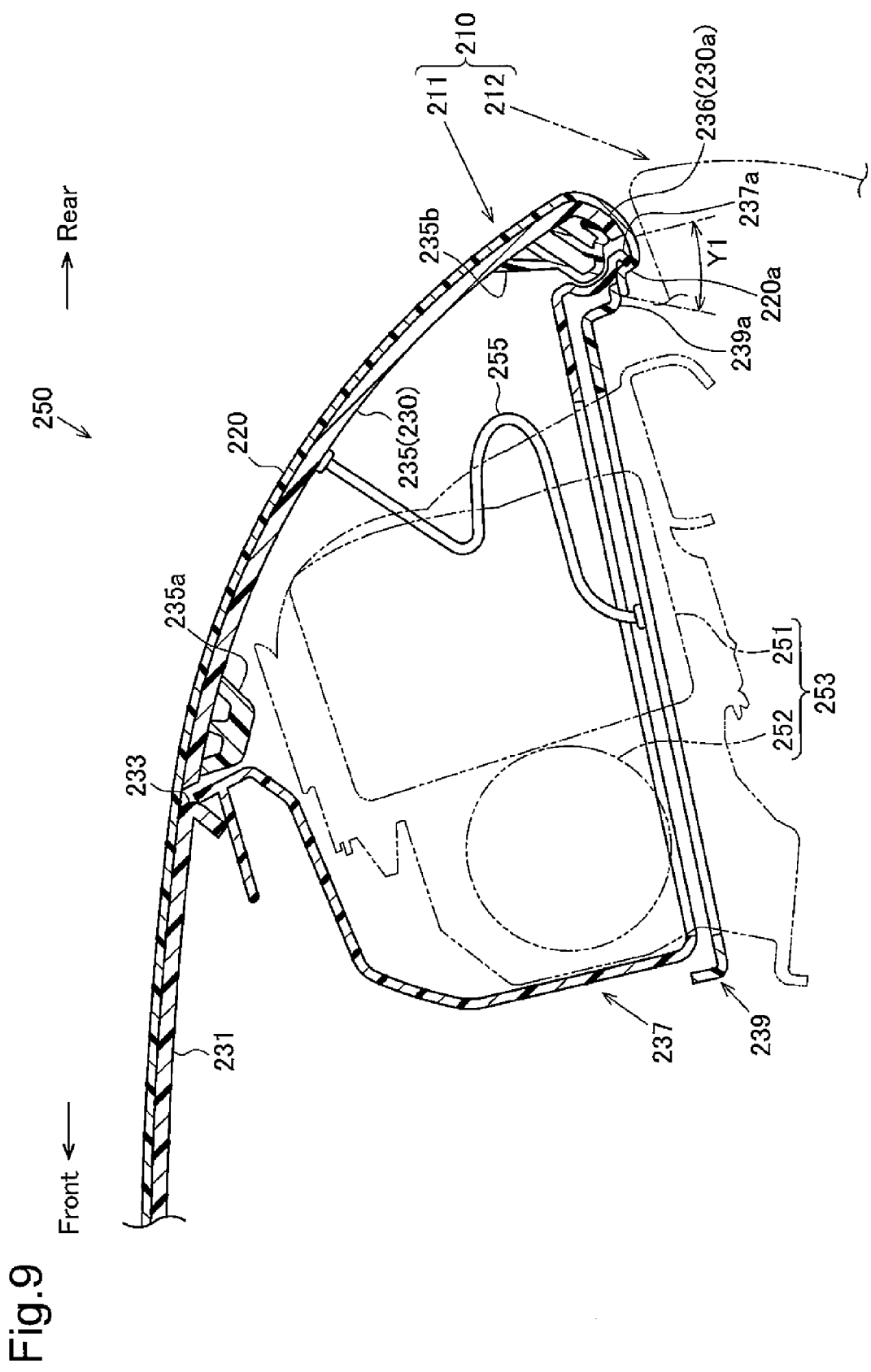
FIG. 9 is a cross-sectional view taken along line 9-9 in FIG. 8.
Figure 10:
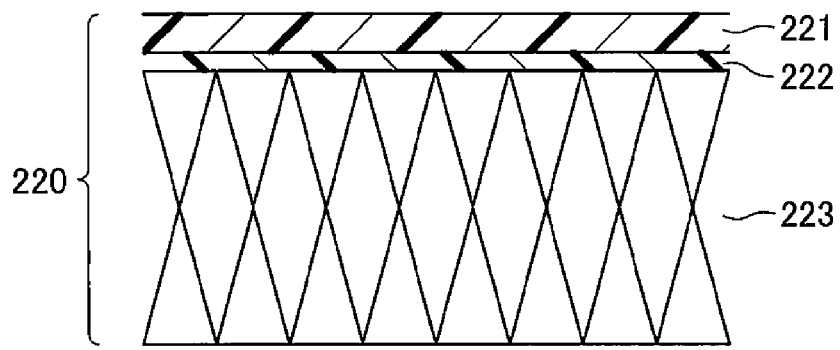
FIG. 10 is a cross-sectional view of a cover member of the second embodiment.

As shown in FIGS. 8 and 9, an instrument panel 210 of the second embodiment includes an upper panel 211 and a lower panel 212 in a manner similar to the first embodiment. As shown in FIG. 10, a cover member 220 has a triple-layer structure including a base fabric layer 222, a cover layer 221, which is adhered to the outer surface of the base fabric layer 222, and a cushion layer 223, which is adhered to the inner surface of the base fabric layer 222, in a manner similar to the first embodiment.

The entire thickness of the base fabric layer 222 and the cover layer 221 ranges from 0.3 to 1.0 mm. It is preferred that the entire thickness of the base fabric layer 222 and the cover layer 221 be from 0.4 to 0.7 mm. When the thickness is less than 0.3 nm, the strength of the base fabric layer 222 and the cover layer 221 for adhering them to the surface of the cushion layer 223 may not be secured. When the thickness is greater than 1.0 mm, the base fabric layer 222 and the cover layer 221 may not be broken in a preferred manner.

The thickness of the cushion layer 223 is preferably from 2.5 to 3.0 mm. The cushion layer 223 is formed by knitting a yarn formed from the synthetic resin fibers described above and having a diameter of approximately 0.01 to 1 mm. When the yarn has a diameter of 1 mm or greater, the texture of the cushion layer 223 becomes coarse, and the application of an adhesive becomes difficult. When the yarn has a diameter of less than 0.01 mm, the texture of the cushion layer 223 becomes fine. This increases the strength of the cushion layer 223, and breaking of the cushion layer 223 becomes difficult. It is preferred that the yarn have a diameter of 0.05 to 0.5 mm. In the second embodiment, a yarn having a diameter of approximately 0.1 mm is used.

Figure 11:
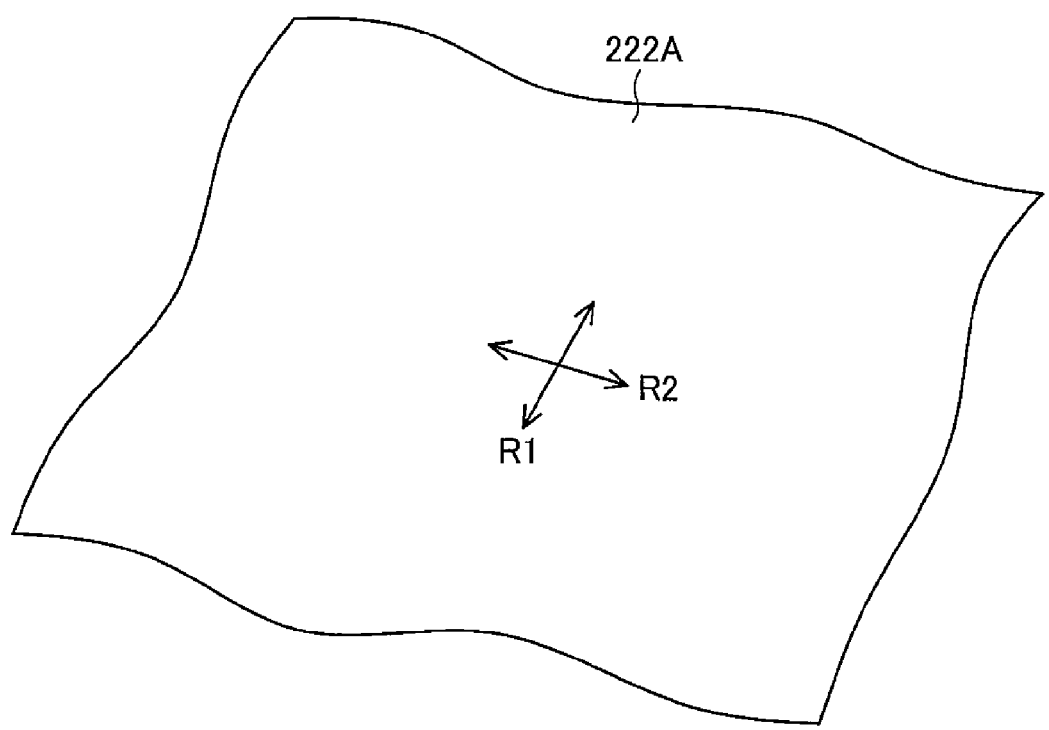
FIG. 11 is a schematic view showing the tensile strength anisotropy of the raw fabric of a base fabric layer in the second embodiment.

As shown in FIG. 11, a raw fabric 222A of the base fabric layer 222 is anisotropic in tensile strength in a direction extending along the plane of the raw fabric 222A. That is, the raw fabric 222A has the minimum tensile strength in a predetermined direction R1 extending along the plane of the raw fabric 222A, and the raw fabric 222A has the maximum tensile strength in a predetermined direction R2, which is orthogonal to the direction R1. The cover layer 221 of the second embodiment is not anisotropic in tensile strength in a direction extending along the plane of the cover layer 221. Thus, the cover member 220 has the minimum tensile strength in the direction R1.

Figure 12:
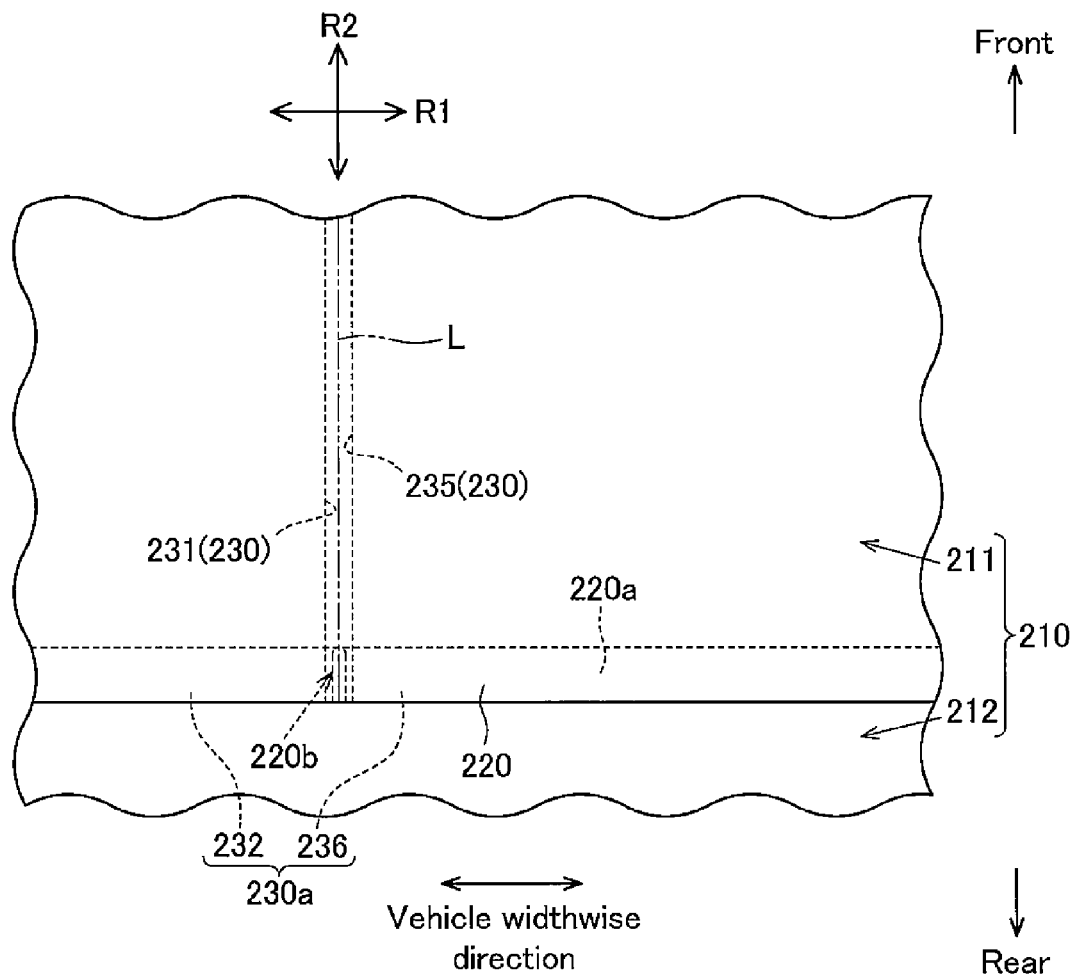
FIG. 12 is an enlarged front view of portion X in FIG. 8.

As shown in FIG. 12, the cover member 220 is adhered to the base member 230 so that the direction R1, in which the tensile strength of the cover member 220 is minimum, extends in the vehicle widthwise direction.

Figure 13:
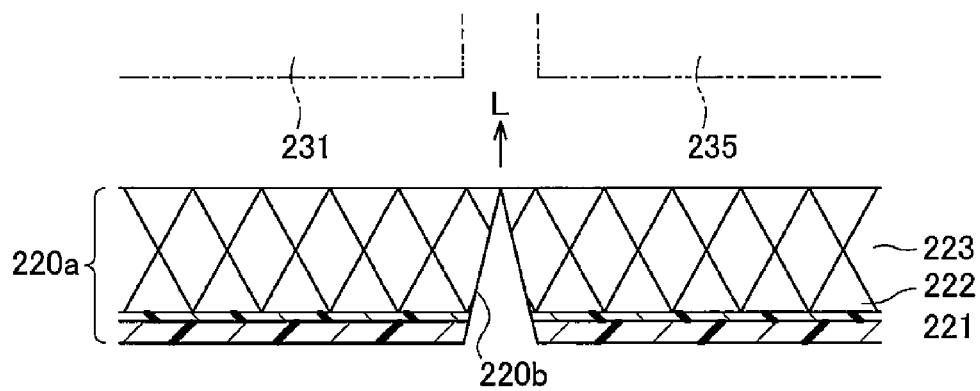
FIG. 13 is a cross-sectional view showing a portion of the cover member including a notch in the second embodiment.

As shown in FIGS. 9 and 12, a notch 220b is formed in a portion between a door portion 235 and a base member body 231 in an extension 220a of the cover member 220. The notch 220b extends along the boundary line L between the door portion 235 and the base member body 231. That is, the notch 220b extends throughout range Y1, which is shown by the arrows in FIG. 9. As shown in FIG. 13, the notch 220b has a V-shaped cross section. Thus, the portion of the cover member 220 having the notch 220b is a fragile portion that has lower strength than the other portions.

Next, the operation of the second embodiment will be described.

When impact is applied to the automobile from the front, inflation gas is supplied from the inflator 252 to the airbag 251. The inflation pressure of the airbag 251 pushes the door portion 235 toward the outside.

When the door portion 235 is pushed, the cover member 220 starts to break apart toward the left and right from the notch 220b along the boundary line L between the door portion 235 and the base member body 231. The tensile strength of the cover member 220 is the smallest in the vehicle widthwise direction. Thus, the cover member 220 is broken smoothly along the boundary line L, which extends in a direction orthogonal to the vehicle widthwise direction. This opens a rear end 236 of the door portion 235 toward the outside and the airbag 251 moves out of the upper panel 211.

In addition to the advantage (2) of the first embodiment, the vehicle interior panel and vehicle airbag device of the second embodiment have the advantages described below.

(3) The rear end 236 of the door portion 235 forms the base member rear end 230a together with the rear end 232 of the base member body 231. The cover member 220 includes the extension 220a, which extends from the base member rear end 230a toward the inner side of the base member 230. The notch 220b is formed in the extension 220a of the cover member 220 and located between the door portion 235 and the base member body 231.

In such a structure, the cover member 220 is broken in a preferred manner merely by forming the notch 220b in the extension 220a of the cover member 220, which extends toward the inner side of the base member rear end 230a. Thus, the upper panel 211 can be manufactured more easily than a structure in which a tear groove is formed in the inner surface of a cover member and the cover member is adhered to a base member so that the tear groove is aligned with the boundary line between a door portion and a base member body. Since the notch 220b is formed in the cover member 220 and located at the inner side of the base member rear end 230a, the aesthetic appeal of the cover member 220 is maintained. This facilitates manufacturing of the upper panel 211, which is broken in a preferred manner by the inflation pressure of the airbag 251, without adversely affecting the aesthetic appeal of the cover member 220.

(4) The cover member 220 includes the base fabric layer 222 and the cover layer 221, which is adhered to the surface of the base fabric layer 222. The base fabric layer 222 is formed of the raw fabric 222A, which is anisotropic in tensile strength in a direction extending along the plane of the raw fabric 222A. The cover member 220 is adhered to the base member 230 so that the direction in which the tensile strength of the cover member 220 is the smallest extends along the vehicle widthwise direction.

In such a structure, the tensile strength of the cover member 220 is the smallest in the vehicle widthwise direction, that is, the direction orthogonal to the boundary line L between the door portion 235 and the base member body 231. Thus, the cover member 220 is broken along the boundary line L in a preferred manner. The upper panel 211 can accordingly be broken by the inflation pressure of the airbag 251 in a preferred manner.

Modified Examples

The vehicle interior panel and the vehicle airbag device of the present invention are not limited to the foregoing structures. It should be understood that the embodiment may be implemented in the following forms.

In each of the above embodiments, the cushion layers 23 and 223 of the cover members 20 and 220 are each formed of the raw fabric of a double-raschel knitting. Instead, for example, a cushion layer formed of a raw fabric of, for example, three-dimensional knitting such as tricot knitting may be used. Alternatively, a cushion layer formed of, for example, foamed polyurethane may be used.

In each of the above embodiments, the door portion and the base member body may be formed from different materials.

In each of the above embodiments, the door portion and the base member body may be formed integrally. That is, a tear groove may be formed in the inner surface of the base member, and the door portion may be opened when the base member starts to tear from the tear groove.

Figure 14:
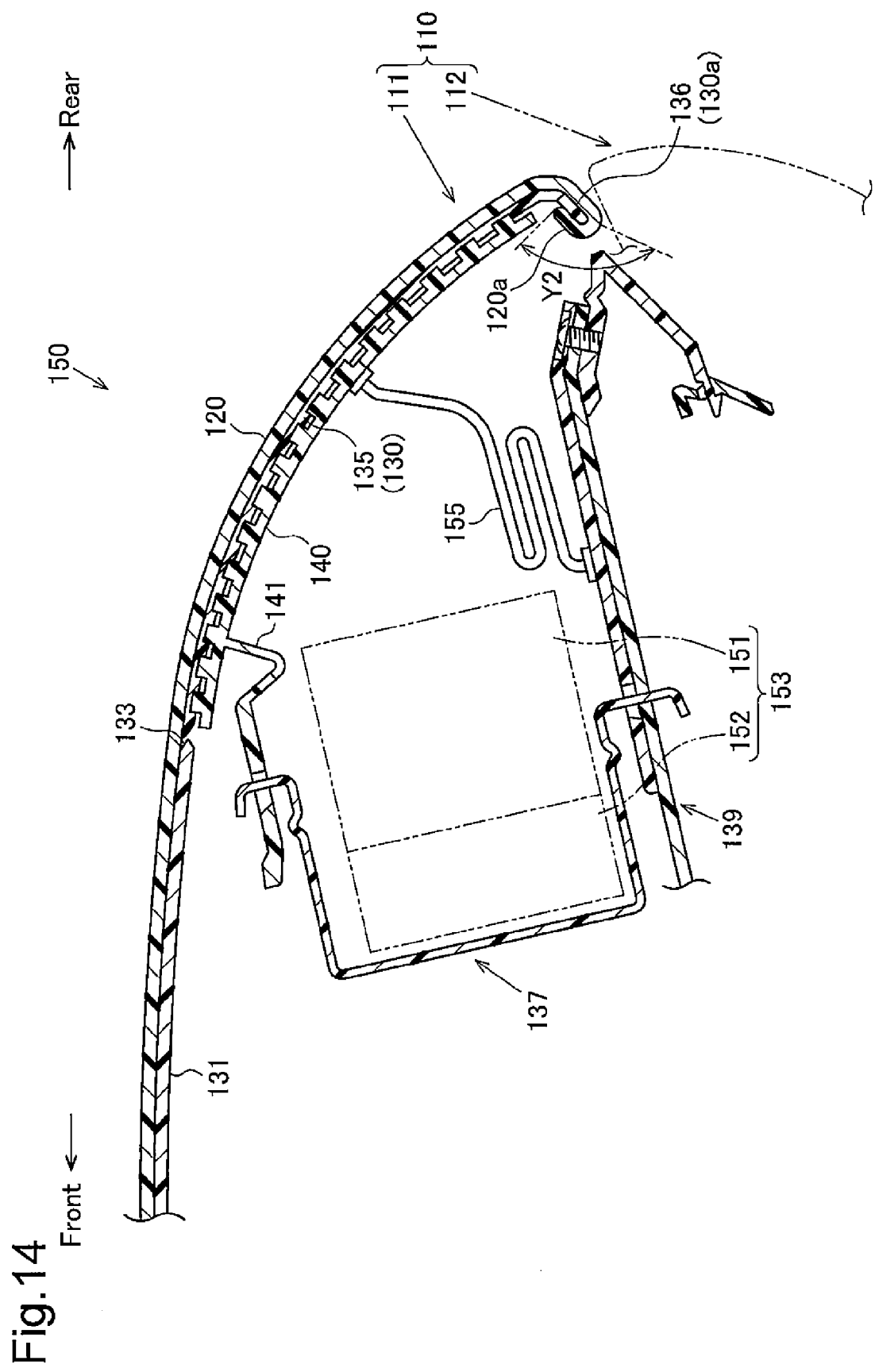
FIG. 14 is a cross-sectional view of an instrument panel showing a modified example of the present invention.

As shown in FIG. 14, a reinforcement airbag door 140 may be adhered to the inner surface of the door portion 135, and the reinforcement ribs on the inner surface of the rear end 136 of the door portion 135 may be omitted. In this case, as shown in FIG. 14, the extension 120a of the cover member 120 may be folded in the rear end 136 of the door portion 135 to contact the inner surface of the rear end 136. Further, as shown in FIG. 14, the airbag door 140 can be coupled to the retainer 137 by a hinge 141.

A base fabric layer formed of fibers of resins other than polyester, such as nylon, may be used. A base fabric layer formed of a cloth may be used instead of the base fabric layer 22 that is formed by knitting.

In the first embodiment, the adhesive layer 40 is formed of an adhesive made of chloroprene rubber. An adhesive layer formed of an adhesive other than chloroprene, such as urethane, may be used.

As described in each of the above embodiments, it is preferred that the support belt 55 be provided to restrict the maximum open degree of the door portion 35. However, the structure for restricting the maximum open degree of the door portion is not limited, and the support belt may be omitted if the maximum open degree of the door portion can be restricted in a preferred manner by another structure.

In the structure of FIG. 14, a notch may be formed in a portion between the door portion 135 and the base member body in the extension 120a of the cover member 120 in a manner similar to the second embodiment. That is, a notch may be formed throughout range Y2, which is shown by the arrows in FIG. 14.

The direction orthogonal to the boundary line between the door portion and the base member body does not have to be completely parallel to the direction in which the tensile strength of the base fabric layer is the smallest. This differs from the second embodiment. Even when the direction R1 is slightly deviated from the direction orthogonal to the above boundary line, the advantage (3) of the second embodiment can be obtained. A deviation of up to eight degrees from the direction orthogonal to the boundary line between the door portion and the base member body is allowed for the direction R1.

The notch 220b is formed from the cover member 221 to the cushion layer 223 in the second embodiment. Instead, for example, a notch may be formed only in a cushion layer, a base fabric layer, or a cover layer. In short, a fragile portion only needs to have lower strength than other portions.

The invention claimed is:

1. A vehicle interior panel comprising:

a base member including a door portion; and a cover member adhered to a surface of the base member by an adhesive layer, wherein the door portion includes an end that is opened by an inflation pressure of an airbag, the end of the door portion forms a base member end together with an end of a base member body of the base member, the adhesive layer has an adhesive force set so that the cover member that covers a portion of the base member body that is adjacent to the door portion is separated from the adjacent portion as the door portion opens when pushed by the inflation pressure of the airbag, and a restriction member restricts a maximum open degree of the door portion, and the restriction member couples the door portion to a structure located inside the base member.

2. The vehicle interior panel according to claim 1, wherein the restriction member is arranged on two ends of the door portion in a vehicle widthwise direction.

3. A vehicle airbag device comprising:

the interior panel according to claim 1; and an airbag module including an airbag that is inflated and deployed when supplied with gas.

4. A vehicle interior panel comprising:
a base member including a door portion; and
a cover member adhered to a surface of the base member, wherein
the door portion includes an end that is opened by an inflation pressure of an airbag,
the end of the door portion forms a base member end together with an end of a base member body of the base member,
the cover member includes an extension extending from the base member end toward an inner side of the base member,
a fragile portion is arranged in a portion in the extension of the cover member between the door portion and the base member body,
the cover member is formed of a raw fabric that is anisotropic in tensile strength in a direction extending along a plane of the cover member, and
the cover member is adhered to the base member so that a direction in which the tensile strength of the cover member is minimum extends along a direction orthogonal to a boundary line between the door portion and the base member body.

5. The vehicle interior panel according to claim 4, wherein
the cover member includes a base fabric layer and a cover layer that is adhered to a surface of the base fabric layer, and
the base fabric layer is formed of a raw fabric that is anisotropic in tensile strength in a direction extending along a plane of the base fabric layer.

6. The vehicle interior panel according to claim 4, wherein the fragile portion is a notch formed in a surface of the cover member.

7. A vehicle airbag device comprising:
the interior panel according to claim 4; and
an airbag module including an airbag that is inflated and deployed when supplied with gas.

8. A vehicle interior panel comprising:
a base member including a door portion; and
a cover member adhered to a surface of the base member, wherein
the door portion includes an end that is opened by an inflation pressure of an airbag,
the end of the door portion forms a base member end together with an end of a base member body of the base member,
the cover member includes an extension extending from the base member end toward an inner side of the base member,
a fragile portion is arranged in a portion in the extension of the cover member between the door portion and the base member body, and
a restriction member restricts a maximum open degree of the door portion, and the restriction member couples the door portion to a structure located inside the base member.

9. The vehicle interior panel according to claim 8, wherein the restriction member is arranged on two ends of the door portion in a vehicle widthwise direction.

10. A vehicle airbag device comprising:
the interior panel according to claim 8; and
an airbag module including an airbag that is inflated and deployed when supplied with gas.

* * * * *